United States Patent
Engelhardt et al.

[11] Patent Number: 5,826,647
[45] Date of Patent: Oct. 27, 1998

[54] HEAT EXCHANGER

[75] Inventors: Wolfgang Engelhardt, Oberkasseler Strabe 64, D-40545 Dusseldorf, Germany; Massimo Colombo, Montevecchia, Italy

[73] Assignee: Wolfgang Engelhardt, Germany

[21] Appl. No.: 682,790

[22] PCT Filed: Feb. 6, 1995

[86] PCT No.: PCT/DE95/00147

§ 371 Date: Jul. 3, 1996

§ 102(e) Date: Jul. 3, 1996

[87] PCT Pub. No.: WO95/22037

PCT Pub. Date: Aug. 17, 1995

[30] Foreign Application Priority Data

Feb. 9, 1994 [DE] Germany ............... 44 04 068.7

[51] Int. Cl.[6] .............. F28F 19/00; F28D 7/10; F28D 15/02
[52] U.S. Cl. ............... 165/134.1; 165/104.21; 165/154; 165/158
[58] Field of Search ............ 165/134.1, 104.21, 165/154, 158, 95

[56] References Cited

U.S. PATENT DOCUMENTS

| | | | |
|---|---|---|---|
| 2,376,505 | 5/1945 | Rathbun et al. | 165/134.1 X |
| 2,966,340 | 12/1960 | Chapman | 165/134.1 X |
| 3,213,833 | 10/1965 | Cunningham et al. | 165/104.21 X |
| 3,364,983 | 1/1968 | Krinov et al. | |
| 3,421,574 | 1/1969 | Kals | 165/104.21 X |
| 3,802,497 | 4/1974 | Kummel et al. | |
| 3,907,026 | 9/1975 | Mangus | 165/134.1 X |
| 4,247,530 | 1/1981 | Cheng et al. | |
| 4,585,057 | 4/1986 | Marburger | |
| 4,770,239 | 9/1988 | Duponteil | 165/134.1 |
| 4,858,684 | 8/1989 | Brucher et al. | |

FOREIGN PATENT DOCUMENTS

| | | |
|---|---|---|
| 839806 | 5/1952 | Germany |
| 223805 | 5/1972 | Germany |
| 1751085 | 7/1972 | Germany |
| 2725045 | 6/1977 | Germany |
| 2948201 | 6/1981 | Germany |
| 3715712 | 7/1988 | Germany |
| 3715713 | 7/1988 | Germany |
| 3822808 | 1/1990 | Germany |
| 276335 | 2/1990 | Germany |
| 3930205 | 3/1991 | Germany |

Primary Examiner—Leonard R. Leo
Attorney, Agent, or Firm—Vickers, Daniels & Young

[57] ABSTRACT

The heat exchanger (100) encompasses an vertical housing (1), in which a bundle (50) of parallel pipes (30) is provided, which pipes extend between a lower pipe header (10) and an upper pipe header (20) and can be flowed through by a hot process gas that enters at the intake (4) and exits at the outlet (9). At the outer circumference of the pipes (30), the heat of the process gas is transferred to a fluid cooling medium, for example air, that enters the housing (1) at the intake (17) and exits it at the outlet (24). The highest pipe (30) temperatures occur in the region of the lower pipe header, which, for this reason, is configured as a double pipe header (10) that is cooled by boiling water (FIG. 1).

25 Claims, 4 Drawing Sheets

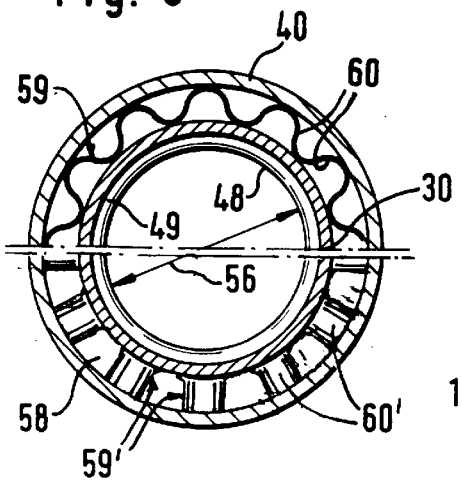
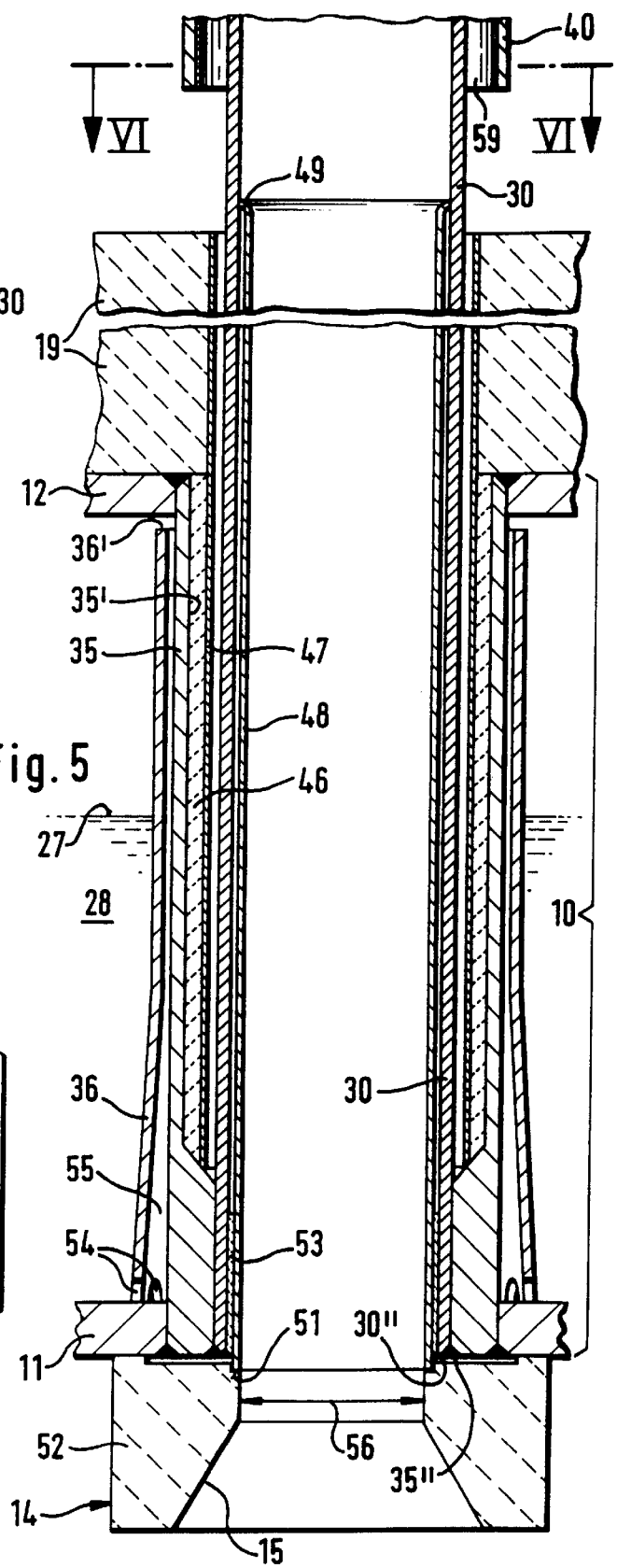

HEAT EXCHANGER

The invention relates to a heat exchanger of the type for cooling process gases containing finely-dispersed solid components at high temperatures, preferably between 800° and 1200° C., particularly for carbon black production.

BACKGROUND OF THE INVENTION

Heat exchangers of this type are known from, for example, German Published, Non-Examined Patent Application DE-OS 27 25 045, German Patent DE-PS 29 48 201 and U.S. Pat. No. 3,364,983. These heat exchangers, which are used in systems for carbon black production, are the point of departure for the invention. The bulk of the carbon black serves as a filler in the tire industry. It is obtained by means of substoichiometric combustion of a heavy oil residue (feed stock). The process gas that forms during combustion carries along the carbon black, in finely-dispersed form, and is conveyed through the pipes of the heat exchanger. The temperature of the process gas as it enters the heat exchanger is in a range of approximately 800° C. to 1200° C., typically in a range of 800° to 1050° C. As it passes through the pipes, the process gas is cooled to temperatures in an order of magnitude of 550° to 650° C. as heat exchange occurs. The exchange medium, generally cooling air (process air), flows along the outer circumference of the pipes, in the opposite direction of the process gas, and is warmed during the process from, for example, between 40° and 60° C. to between 700° and 800° C. Air heated in this way can be used as preheated combustion air.

Some types of carbon black carried along by the process gas have the tendency to deposit on and clog the surrounding surfaces. This is particularly the case for the flow supply pipes; consequently, they are equipped with a cleaning apparatus, by means of which a blast of steam or other compressed gas can be sent through the pipes at regular intervals to loosen the deposited carbon black from the wall and entrain it. Cleaning apparatuses of this type are known from the three cited publications.

In practice, the pipes, and thus the entire heat exchanger, have a considerable length of approximately 8 to 12 meters, and are combined to form a pipe bundle of approximately 50 to 100 in a boiler-type housing, which is generally cylindrical. The assemblies can be arranged vertically or horizontally.

While carbon black production was the starting point for the invention, similar problems can also occur in other chemical and combustion processes in which process gases are formed that contain finely-dispersed solid components and are to be cooled.

A critical feature of heat exchangers of this type are the pipe headers arranged on the side of the process gas intake chamber, which are in a high temperature range and must endure a temperature difference of several 100° C. on their two sides. In addition, the geometrical shape of the pipe headers as a plate provided with multiple perforations is unsuitable for continuous thermal exposure. In the past, therefore, cracks appeared repeatedly in the pipe headers. This led to the formation of air on the one hand and carbon-containing gas on the other hand, as well as the presence of high temperatures and excessive combustion inside the heat exchanger, resulting in a breakdown of the same within a short time. When this occurs, of course, the entire upstream and downstream production line must be halted. The resulting damage extends well beyond merely replacing the heat exchanger, which already represents a large unit associated with a corresponding investment.

From DE-OS 22 23 805, it is already known to reduce the temperature stress of the pipe header disposed on the side of the process gas intake chamber by configuring the pipe header as a double pipe header flowed through by a cooling medium. No details are disclosed regarding the cooling medium and its conduction. If the cooling medium is flowing water, the cooling performance is limited in the region of the double header, because the cooling performance is a function of the limited transfer of heat from the steel of the pipes and the headers to the liquid water.

SUMMARY OF THE INVENTION

It is the object of the invention to improve the operating reliability of a generic heat exchanger by improving the cooling in the region of the double pipe header.

This object is accomplished by the heat exchanger for cooling process gases of the present invention.

With boiling-water cooling, it is possible to repeatedly cast water or a water/steam mixture against the upper pipe header of the double pipe header, where it evaporates and, in the region of the critical welded points of the pipes, carries off essential quantities of heat by way evaporation. The temperature of the double pipe header arranged on the side of the process gas intake is thereby decreased considerably, causing the material to attain a range of better mechanical properties. The boiling-water cooling is effected by the partial filling of the double pipe header with water.

The two individual pipe headers of the double pipe header are arranged vertically one above the other, and the cooling water fills the space between the pipe headers, or above the lower pipe header, to a specific level. The lower ends of the pipes extend vertically through the double header. To permit control of the pressure in the double header, the steam is condensed externally by means of air or water. The heat obtained in this manner can be used further in some other way. The condensate is circulated back into the double header, so the quantity of cooling water of the double header circulates of its own accord, eliminating the need for pumps.

The control of the cooling performance can be effected in a manner wherein the condenser is water cooled and a thermal element that measures the temperature of the water in the double pipe header is provided for controlling the quantity of cooling water supplied to the condenser.

Because thermal stress on the pipes is the greatest in the vicinity of the gas entrance, it is advisable to provide in the area of the double pipe headers loosely-inserted, inner protective coverings, which can be easily exchanged, and prevent the process gas from directly acting upon the inner pipe circumference on the first segment of the path of flow, where the highest temperatures occur.

To avoid having to perform complicated disassembly on the double pipe header during an exchange, specifically involving cutting work, it is advantageous for the pipes to be surrounded by separating pipes connected tightly to the two pipe headers of the double pipe header.

The double pipe header, along with the separating pipes penetrating it, constitutes a closed unit in which the long heat exchanger pipes can be easily exchanged.

The separating pipes, however, have the additional task of slowing the transfer of heat from the starting region of pipes into the cooling water in the double pipe header.

In the double pipe header, the cooling water can enter the space between the socket and the separating pipe through the opening at the lower edge of the socket and be evaporated by the contact with the lower part of the hot separating pipe, whereupon the created steam shoots upward in the narrow space between the socket and the separating pipe, and the entrained water/steam mixture assures an effective thermal dissipation from the outer circumference of the separating pipe, and cools the thermally high-stressed welded point of the separating pipe in the upper pipe header of the double pipe header.

The invention discloses the manner in which the cooling medium, in most instances cooling air, can be made considerably effective if it is conducted through the annular space between the pipe and the jacket, and how the cooling medium can be brought into and back out of this intermediate space.

The jacket is an additional pipe that normally surrounds the respective heat exchanger pipe concentrically with spacing, leaving a sufficient flow cross section for the cooling medium between the two pipes. The inner diameter of the jacket can be, for example, 1.2 to 1.5 times the outer diameter of the respective pipe. The additional heat transfer surface at the inner circumference intensifies the transfer of heat from the pipes to the cooling medium as compared to the case in which the pipes are in contact with the cooling medium flow without a jacket. The jacket heats itself, and for its part radiates and, moreover, reflects thermal radiation emitted from the outer circumference of the pipes. It has been determined that the mere presence of the tubular jackets clearly permits an increase in the thermal transfer performance.

In principle, the space between the pipes and the jackets can be flowed through by the same flow as in the pipes or by counterflow. To avoid excessive temperature differences in the region of the double pipe header, which is stressed by high temperatures anyway, the counterflow is generally recommended.

A favorable way to introduce the flow of the cooling medium into the intermediate space is also disclosed as is an important embodiment of the jacket arrangement.

With the additional heat transfer surfaces in the intermediate space, the heat transfer performance can be increased up to 20% with respect to pipes not provided with a jacket, which means that the pipes and the entire heat exchanger can be configured up to 20% shorter, assuming the same heat transfer performance. This is a strong argument from an economic argument, considering the great length of the heat exchanger of 8 to 12 m.

The cold and warm states of the pipes are separated by about 1000° C. Because of the length of the pipes connected to the double pipe header, displacements result at the upper pipe end due to differences in thermal expansion of the pipes and the surrounding housing in an order of magnitude of 40 mm. Compensators are useful for combating this, for example the known metal beam compensators.

A further important embodiment of the heat exchanger of the invention is a steam-cleaning apparatus which is known per se in heat exchangers, as can be seen in the three publications cited at the outset.

Alternative options of arranging the steam cleaning apparatus are also disclosed including placing the apparatus at the end of each pipe that projects into the process gas outlet chamber or terminating into the process gas intake chamber.

Another embodiment includes the steam nozzle that is concentric to the pipe axis, is aimed into the pipe and does little to impede the flow of process gases into the pipe. The nozzles arrange before the termination of each pipe in the process gas intake chamber, the steam line of which nozzle is guided through the process gas intake chamber in the segment adjacent to the steam nozzle. This embodiment is preferred because of simplicity and problem-free integration into a double pipe header that has been cooled by boiling water.

Leading the steam line through the process gas intake chamber, in which the high temperatures of the entering process gas dominate, places considerable stress on the pipes of the steam line.

For this reason, it is advisable to utilize the configuration wherein in the double pipe header the steam line is guided close to the relevant pipe, guided downward therethrough the pipe header adjacent to the process intake chamber and into the process gas intake chamber, is bent back thereto-ward the pipe header and supports the steam nozzle at a free end. Further, in the process gas intake chamber, the steam line can form a 180° pipe bend whose legs are parallel to the pipe axis. This has the advantage that only the last, short segment of the steam line need extend in front of the steam nozzle in the process gas intake chamber.

A jacket pipe which surrounds the steam line with radial spacing is also a contemplated arrangement; it creates an intermediate space, which is filled with the hot water standing in the double pipe header. In the last part of the jacket pipe extending in the process gas intake chamber, this water evaporates immediately, and, in the form of steam or a water/steam mixture, shoots through the ascending pipe and into the steam chamber, because the flow resistance for the water or water/steam mixture is less on this side with correspondingly adapted cross sections. In this way, the pipe bend and the nozzle region are constantly flowed through by hot water, steam or a water/steam mixture and cooled. No pumps are required to transport this cooling medium.

To prevent an erosive attack of the part of the pipe bend of the jacket pipe that extends through the process gas intake chamber, as well as of the nozzle, it is advisable to surround this region with an appropriate insulation.

To prevent the double pipe header from emptying when damage occurs to the ascending pipe or the part of the jacket pipe extending in the process gas intake chamber, the end of the jacket pipe on the side of the double pipe header can be used as an overflow.

A cross section relationship is recommended for achieving the desired flow-through of the space between the jacket pipe and the steam line and the adjoining ascending pipe.

The side of the pipe header of the double pipe header facing the process gas intake chamber, which faces the hot process gas that is flowing in, is thermally high-stressed, and expediently has a fireproof sheathing which, in a practical embodiment, can be configured as uniformly shaped, fireproof molded bodies, for example hexagonal stones having a central opening for access to the respective heat exchanger pipe.

BRIEF DESCRIPTION OF THE DRAWINGS

Embodiments of the invention are illustrated in the drawing figure.

FIG. 5 shows a further enlarged view from the region of the double pipe header;

FIG. 6 shows a section according to line VI—VI in FIG. 5;

FIG. 7 shows a view from below of a fireproof molded body according to FIG. 5.

PREFERRED EMBODIMENTS

Figure 1:
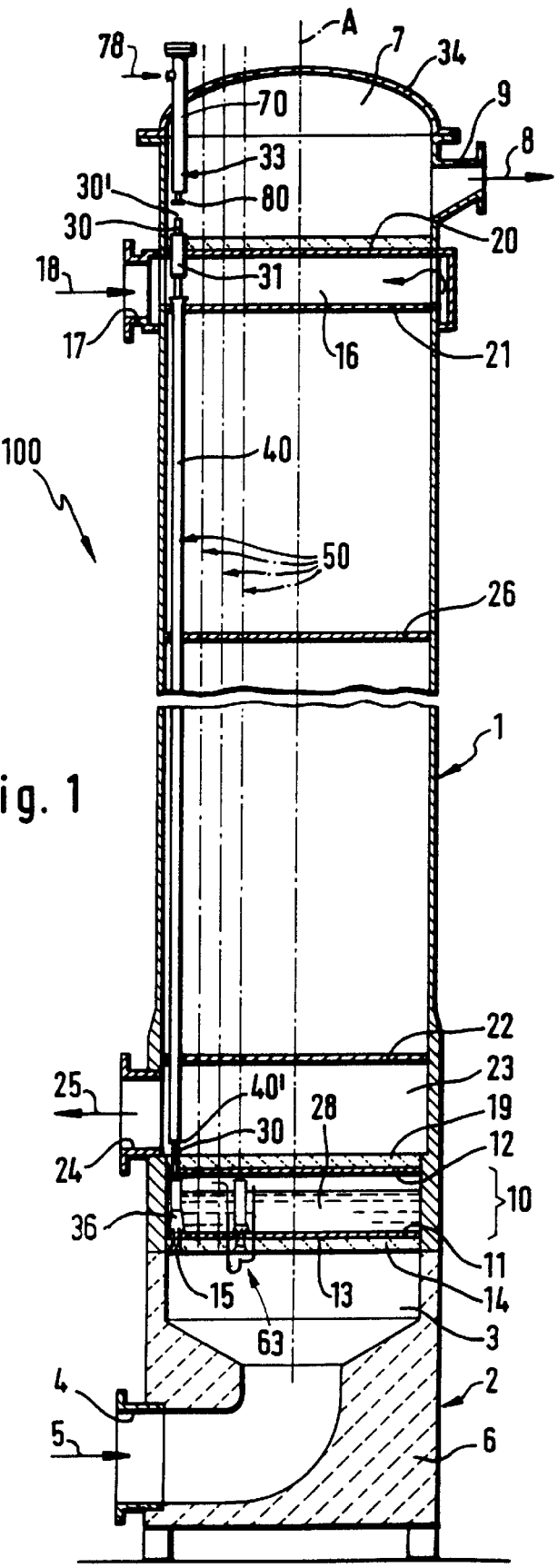
FIG. 1 shows a vertical section through an upright heat exchanger.

The heat exchanger indicated in its entirety by 100 in FIG. 1 encompasses an upright, cylindrical housing 1 of sheet steel and arranged on a substructure 2. A cylindrical process gas intake chamber 3, which has approximately the same diameter as the housing 1 and is open to the top, is arranged inside the housing. The hot process gas, for example having a temperature of 1000° C., enters the substructure 2 laterally at the intake 4, in the direction of arrow 5, and is diverted upward in the substructure into the process gas intake chamber 3. The substructure 2 has a fireproof lining 6.

A double pipe header 10 comprising a horizontal, lower pipe header 11 and a horizontal pipe header 12 arranged approximately 30 cm above it is configured at the lower end of the housing 1, and extends perpendicular to the housing axis A. The lower side 13 of the pipe header 11, which faces the process gas intake chamber 3, is provided with a ceramic sheathing 14 that has conical vent openings 15, as explained in detail below in conjunction with FIG. 5. Only one opening of this type is indicated in FIG. 1.

An upper pipe header 20 that partitions off a process gas outlet chamber 7 from the interior of the housing 1 is provided near the upper end of the housing 1. The process gas introduced at the intake 4 collects in the process gas outlet chamber 7 and leaves it at the outlet 9, in the direction of arrow 8.

The interior of the housing is filled by a pipe bundle 50. The pipe bundle 50 encompasses closely-bundled pipes 30 distributed over the cross section of the housing 1 and extending parallel to the axis A; of these pipes, only one is shown in FIG. 1, and a few others are indicated by their center lines. Depending on the design of the heat exchanger 100, the pipe bundle 50 will comprise, for example, 50 to 100 bundled pipes 30.

The pipes 30 are welded at their lower ends in the lower pipe header 11, and terminate open in a respectively associated, conical vent opening 15 of the fireproof sheathing.

The pipes 30 extend over the entire height of the housing 1, and terminate open in the process gas outlet chamber 7, above the pipe header 20. The process gases introduced at the intake 4 enter the pipes 30 at the lower end and exit the pipes 30 at the upper end to enter the process gas outlet chamber 7. Because the pipes 30 become very hot due to the high temperature of the process gases, and have a considerable length of, for example, 9 meters, considerable thermal expansions occur, since the housing 1 does not possess the high temperatures. Displacements in an order of magnitude of 30 to 50 mm must be taken into account at the ends of the pipes 30 projecting into the process gas outlet chamber 7. The vent opening at the upper pipe header must be completely sealed in order to prevent the mixing of the process gases and the cooling air and thus combustion. For this reason, compensators 31 on the underside of the upper pipe header 20 are provided with metal expansion bellows.

In the upper region of the housing 1, a cooling air intake chamber 16 is formed by an intermediate pipe header 21 arranged at a distance of approximately 10 centimeters beneath the upper pipe header 20. The intake chamber can be supplied with cooling air via a lateral intake 17, in the direction of arrow 18; this air has a normal or only slightly increased temperature.

Each pipe 30 is surrounded by a jacket 40 in the shape of a further pipe whose inner circumference leaves spacing around the outer circumference of the pipe 30. The jackets 40 extend over nearly the entire height of the housing 1, and end immediately above a fireproof lining 19 on the top side of the upper pipe header 12 constituting a part of the double pipe header 10.

Figure 2:
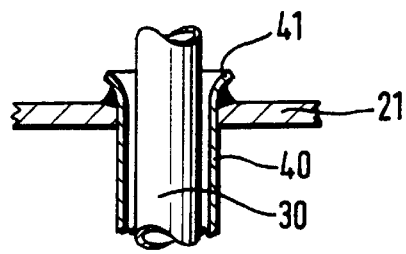
FIG. 2 shows a detailed view from the upper region of FIG. 1.
Figure 3:
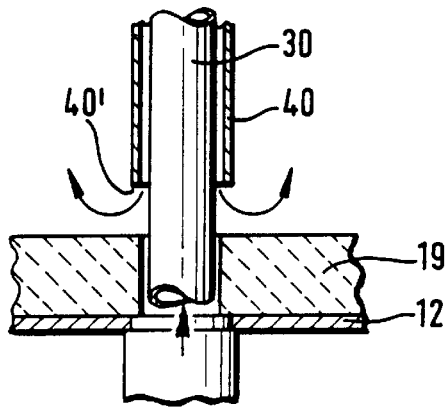
FIG. 3 shows a detailed view from the lower region of FIG. 1.

A cooling air outlet chamber indicated in its entirety by 23 is partitioned by an intermediate pipe header 22 arranged with spacing above the pipe header 12; the height of this chamber essentially corresponds to that of the cooling air intake chamber 16, which the cooling air enters from the lower, open ends of the jackets 40 and from which it can be carried off at an outlet 24 in the direction of arrow 25. The jackets are secured to the intermediate pipe header 21 and hang freely downward from it. The distance of the lower end 40' from the fireproof layer 19 takes into account the thermal expansion that occurs. Sufficient space for the exit of cooling air must be provided at all times. At the upper end, the jackets 40 are expanded in a funnel shape by means of beading, as shown at 41 in FIG. 2, in order to facilitate the entrance of the cooling air into the intermediate space between the pipe 30 and the jacket 40.

Because the pipes 30 and the jackets 40 possess a considerable height, an additional intermediate pipe header 26 or a plurality thereof is provided and distributed over the height in order to stabilize the pipe bundle 50.

The flue gas outlet chamber 7 is closed to the top by a flanged lid 34 which, in one embodiment, simultaneously serves as a carrier for steam-cleaning apparatuses 33, by means of which a blast of steam can be sent into the pipes 30 from above at intervals of, for example, one minute in order to loosen deposits of finely-dispersed, solid materials, such as carbon black, that are starting to build up on the inner wall, and force them out downward through the pipe 30.

Figure 4:
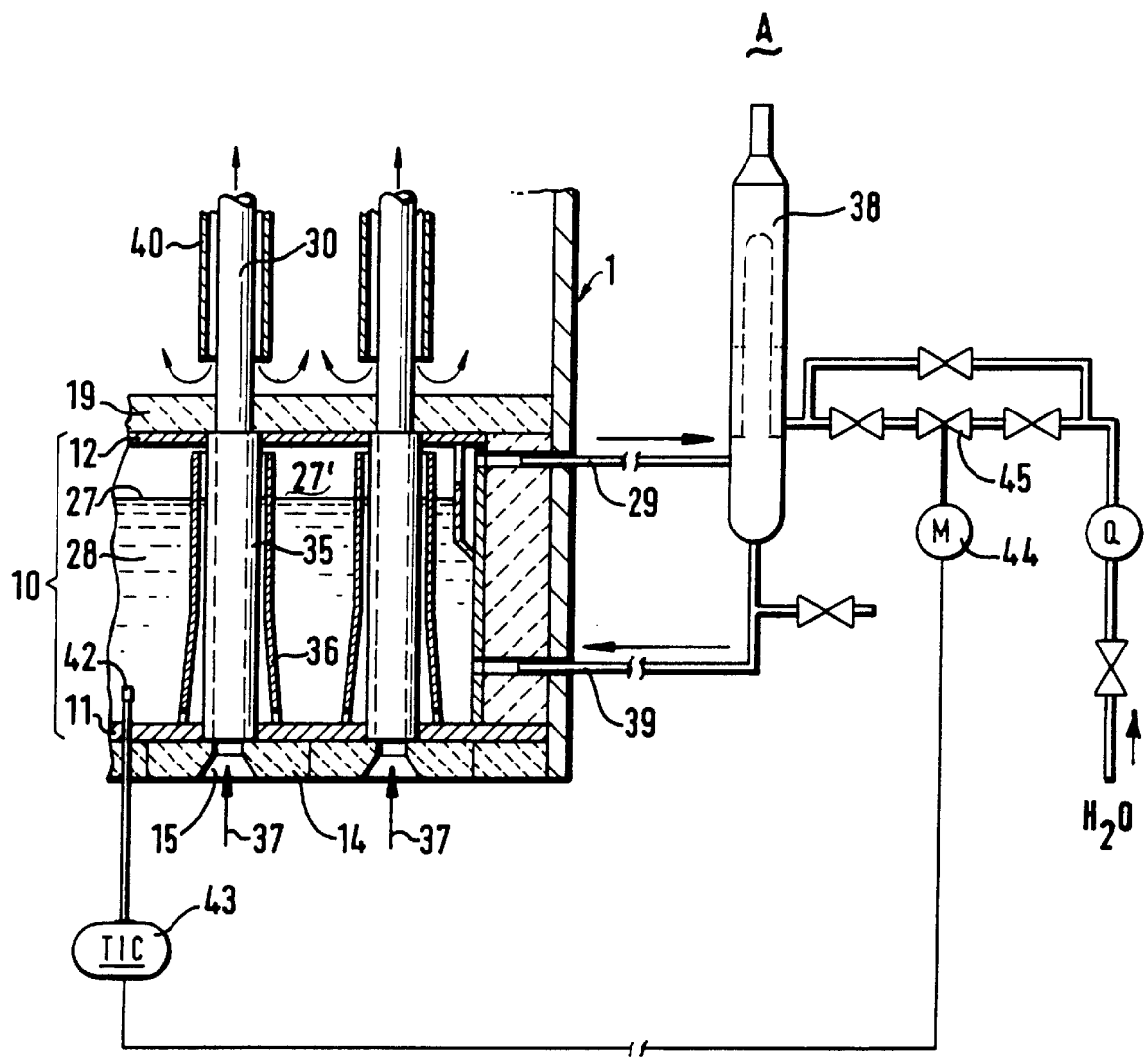
FIG. 4 shows an enlarged view from the region of the double header, with the associated steam guide.

FIG. 4 shows the double pipe headers 10 in somewhat greater detail, as well as the control of the boiling-water cooling omitted in FIG. 1. The space between the pipe headers 11 and 12 is filled with water 28 to a fill level 27. The pipes 30 are surrounded over the height of the double pipe header 10 by separating pipes 35, which are tightly welded to the pipe headers 11, 12. The pipes 30 are simply penetrated by the separating pipes 35, and do not come into direct contact with the cooling water 28.

The separating pipes 35 are in turn surrounded, with a small radial spacing, by a socket 36 that is expanded cylindrically at the top and slightly conically at the bottom and serves to bring about the boiling-water cooling of the lower end of the separating pipe 35 or the pipe 30, as ensues in detail from FIG. 5.

The hot flue gases enter the pipes 30 from below, in the direction of arrows 37, thus heating their lower end intensely. The water 28 begins to boil. The resulting steam is drawn out of the steam chamber above the water level 27, via the line 29, and supplied to a water-cooled condenser, in which it is condensed; the condensate is subsequently conducted back into the double pipe header 10 via the line 39.

The temperature in the double pipe header 10 is dependent on the prevailing pressure. It is measured by a thermoelement 42 and converted into an electrical signal at a converter 43, by means of which a motor 44 can be operated for the purpose of controlled adjustment of a valve 45. The valve 45 determines the quantity of cooling water supplied to the condenser 38 from the $H_2O$ network in the direction of the arrow, and therefore the cooling performance of the condenser 38 in relation to the heating performance of the flue gases in the double pipe header 10. The cooling water evaporates or vaporizes in the condenser 38 and either escapes into the atmosphere A or is utilized as warming water. The more cooling water is supplied, the greater the condensation output. The pressure in the double pipe header 10 drops. The delivery of heat by the process gases counteracts this. An equilibrium or a desired water and steam temperature that can be adjusted by corresponding operation of the valve 45 results in the double pipe header 10. In most cases, a pressure of 15 to 20 bar is maintained in the double pipe header 10, corresponding to temperatures of 180° to 200° C., which are favorable for preventing corrosion caused by condensing components of the process gases.

It can be seen in FIG. 5 that the separating pipe 35 surrounding the respective pipe 30 is welded tightly into the two pipe headers 11, 12 of the double pipe header 10. The upper three-quarters of the height of the separating pipe 35 has an increased inner diameter, so fireproof insulating material 46 can be accommodated between the outer circumference of the pipe 30 and the inner circumference 35' of the separating pipe 35 there; this insulating material is covered toward the inside by a thin-walled pipe 47, so the pipe 30 can be inserted from above without problems. At the lower end 30", the pipe 30 is welded tightly to the inner, lower edge of the separating pipe 35 at 35". Inside the pipe 30, an inner, protective sleeve 48 consisting of thin-walled pipe material is arranged over the height of the double pipe header 10. The outer circumference of this sleeve leaves a small spacing from the inner circumference of the pipe 30, and has a beaded edge 49 above the fireproof sheathing 19, the edge being oriented outwardly for guidance purposes. At the lower end, the protective sleeve 48 is seated on a shoulder 51 of the fireproof molded bodies 52, which form the fireproof sheathing 14. In the region of the lower end, a fireproof insulating material 53 is arranged between the outer circumference of the protective sleeve 48 and the inner circumference of the pipe 30.

The outer, smooth-cylindrical separating pipe 35 is surrounded by a socket 36 to achieve boiling-water cooling; this socket is cylindrical in approximately the upper half, surrounds the outer circumference of the separating pipe 35 with about 2 to 6 mm of play, about 4 mm in the example. In the lower region, the socket 36 expands slightly conically. It stands on the pipe header 11 and has openings 54 at the lower edge that permit the entrance of water 28 into the chamber 55 between the outer circumference of the separating pipe 35 and the inner circumference of the socket 36. At the upper edge 36', the socket 36 leaves spacing in an order of magnitude of 1 cm from the underside of the pipe header 12. The water entering at the openings 54 evaporates at the hot outside of the separating pipe 35, and the steam or, possibly, a steam/water mixture in the space between the inner circumference of the socket 36 and the outer circumference of the separating pipe 35 shoots upward, maintains the outer circumference of the separating pipe 35 at essentially the steam or water temperature, and, in particular, purposefully cools the region of the welded point between the upper edge of the separating pipe 35 and the pipe header 12.

In the exemplary embodiment, the fireproof sheathing 14, which is impacted by the hot process gases flowing toward it from the process gas intake chamber 3, comprises hexagonal molded bodies 52 having uniform contours, each of which is associated with a pipe 30. The molded bodies 52 cover the underside of the pipe header 11 so as to seal it. They have a conically-narrowing opening 15 that tapers down to the inner diameter 56 of the protective sleeve 48. The fireproof molded body has perforations 57 that are penetrated by pins or hooks welded to the underside of the pipe header 11. The molded bodies 52 are therefore suspended beneath the pipe header 11.

It can be seen from FIG. 6 that the inner circumference of the jacket 40 leaves a sufficient spacing from the outer circumference of the pipe 30 to assure a sufficient flow cross section in the intermediate space 58 for the cooling air entering from the cooling air intake chamber 16. Additional heat transfer surfaces 60, 60' are provided in the intermediate space 58. In the upper half of FIG. 6, the heat transfer surfaces 60 are formed by the surface of a piece of sheet metal 59 that is corrugated in a plane perpendicular to the axis of the pipes 30, 40 and is in heat-conducting contact with the outer circumference of the pipe 30. In the example in the lower half of FIG. 6, the heat transfer surfaces 60' are the surfaces of supports 59', webs or ribs distributed over the outer circumference of the pipe 30 and in heat-conducting contact with it. These elements are flowed around by the cooling medium, and leave free a corresponding flow path between themselves. With the additional heat transfer surfaces 60, 60', the transfer of heat from the outer circumference of the pipe 30 to the cooling medium, generally cooling air, flowing through the intermediate space 58 can be notably increased.

In a concrete exemplary embodiment, the outer diameter of the pipe 30 is approximately 90 mm and the inner diameter of the pipe 40 is approximately 115 mm. The pipes 30, 40, the sheet metal pieces and supports 59, 59' and the components of the double pipe header 10 comprise suitable, temperature-resistant steels.

Each pipe 30 is allocated a steam-cleaning apparatus that is disposed at one pipe end and delivers a blast of steam into the pipe from time to time to eliminate deposits forming at the inner pipe circumference.

In an exemplary embodiment indicated on the left side of the housing 1 in FIG. 1, is a steam-cleaning apparatus 33, arranged above the upper end 30' of a pipe 30, as mentioned above. The steam-cleaning apparatus 33 encompasses a cylindrical housing 70 that is welded into the lid 34, coaxially to the axis of the associated pipe 30. A sealing plate 80 formed by a perforated disk is arranged at the lower end; when steam pressure is present, the plate is displaced forward toward the intake 78, is seated at the upper end 30' of the pipe 30 and can serve to direct a blast of steam down into the interior of the pipe 30.

Figure 8:
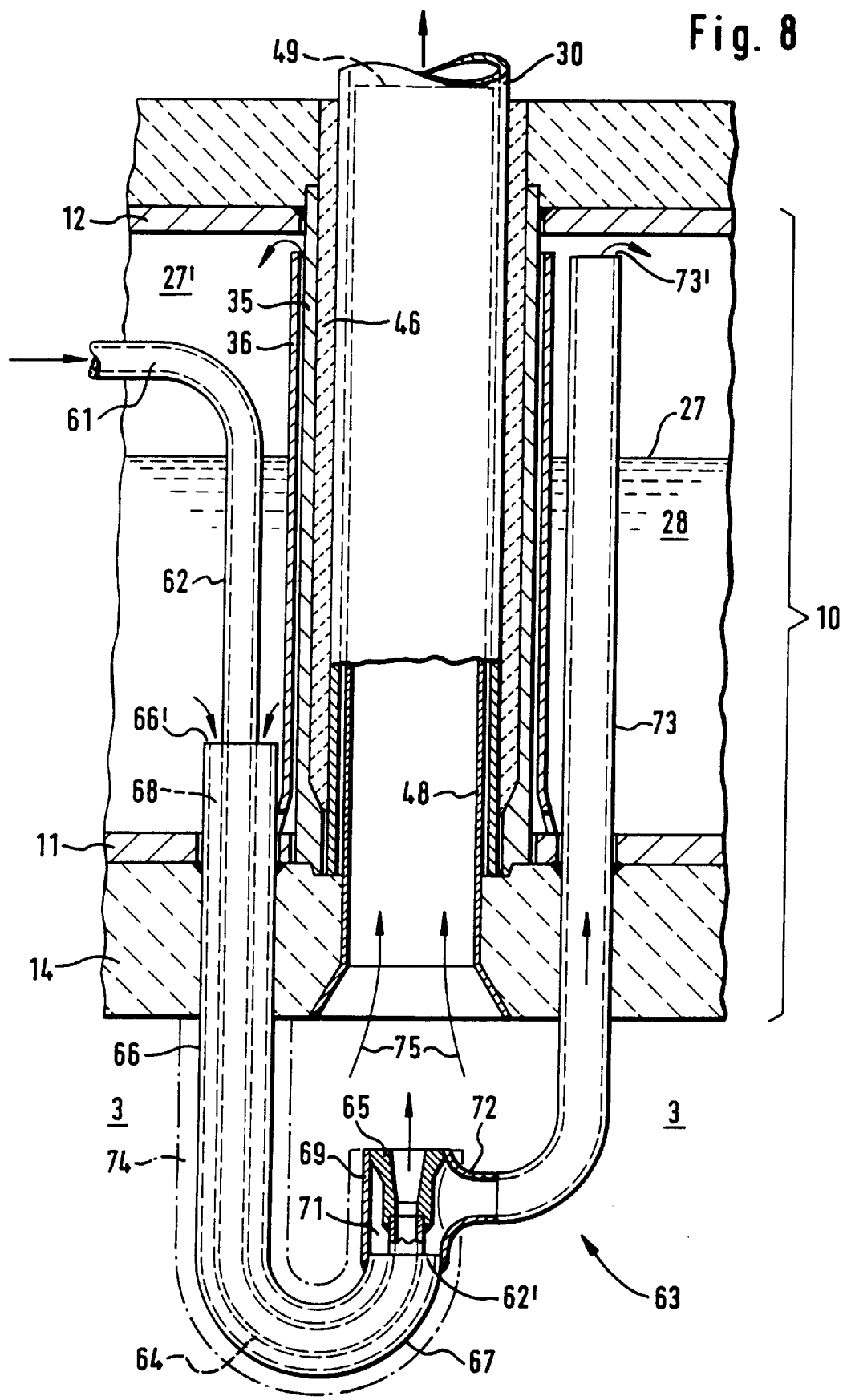
FIG. 8 shows an enlarged view of a modified embodiment of the heat exchanger corresponding to FIG. 5.

An alternative embodiment of a steam-cleaning apparatus 63 that delivers a blast from below is indicated in FIG. 1, in the region of the double pipe header 10, and shown in a more detailed representation in FIG. 8. The reference numerals are identical for parts corresponding to those in FIG. 5.

The steam line 61 is guided through the steam chamber 27' left open above the water level 27 until it is in the vicinity of the respective pipe 30, and bends there into a downward-pointing leg 62 that leads downward through the pipe header 11 and the fireproof sheathing 14 and into the process gas intake chamber 3, in which a 180° pipe bend 64 adjoins the line. A steam nozzle 65 is attached, concentrically to the pipe 30, at the free, upward-pointing leg 62' of this pipe bend.

In the region adjacent to the steam nozzle 65, the steam line 61 is surrounded concentrically by a jacket pipe 66, which likewise leads out of the double pipe header 10 into the process gas intake chamber 3 and forms a 180° pipe bend 67 there. The jacket pipe 66 leaves a space 68 from the outer circumference of the steam line 61. The end 66' of the jacket pipe 66 surrounding the leg 62 is located with spacing above the pipe header 11 and with spacing beneath the water lever 27. Therefore, water 28 can enter the intermediate space 68 at the upper end 66', in the direction of the arrows, and fill the space. The position of the upper end 66' with spacing above the pipe header 11 provides for an overflow function that prevents the double pipe header 10 from emptying completely if a line break occurs in the region of the process gas intake chamber 3.

The steam nozzle 65 is likewise surrounded by a jacket 69, whose interior 71 is connected to the intermediate space 68 and which has a lateral connection 72 adjoined by an ascending pipe 73 that bends upward and enters the double pipe header 10 closely next to the pipe 30 or socket 36. The upper end 73' of the ascending pipe 73, which terminates open, is arranged above the water level 27 and just beneath the upper pipe header 12.

The segment of the jacket pipe 66 extending in the region of high temperatures in the process gas intake chamber 3 can be surrounded by an insulation 74. This also applies, of course, to the corresponding segment of the ascending pipe 73.

From time to time, a blast of steam is introduced into the steam line 61, in the direction of the arrow. This steam enters the pipe 30 from below and loosens deposits sticking to the inner circumference.

Water from the double pipe header 10 enters the intermediate space 68 at the upper end 66' of the jacket pipe 66, in the direction of the arrow, and is immediately vaporized in the region of the process gas intake chamber 3. Because the flow resistance for the steam is less in the region of the ascending pipe 73 than in the region of the intermediate space 68, the formed steam enters the steam chamber 27' in the direction of the arrow 75 and exits toward the upper pipe header 12, not through the intermediate space 68 and into the water 28. A result of this is a transport effect, the consequence of which is that new cooling hot water 28 is always transported through the intermediate space 68 and in the steam chamber 27' in steam form, so the pipe arrangement 62, 64; 66, 67 is maintained at a tolerable temperature. To support this effect, it should be provided that the cross section of the ascending pipe 73 is larger than the cross section of the annular intermediate space 68.

So that the influx of the process gases into the pipe 30, in the direction of the arrows 75, is impeded as little as possible, the steam nozzle 65 is arranged with spacing from the lower end of the pipe 30 or the lower end of the protective sleeve 48 or sheathing 14, and also has an outer cross-section smaller than the inner cross-section of the protective sleeve 48.

Having thus described the invention it is claimed:

1. A heat exchanger for cooling process gases having finely-dispersed solid particles at high temperatures between 800° and 1200° for producing carbon black said heat exchanger including a housing, a bundle of pipes within said housing having opposite ends and extending parallel to one another and closely together for carrying the process gases through the housing, at least first and second pipe headers arranged near the ends of the pipes, transverse thereto and filling the cross section of the housing, the pipes passing axially through said headers in a sealing manner and terminating in open ends, a process gas intake chamber configured at a first end of the housing axially outside of the first pipe header, a process gas outlet chamber configured at a second end of the housing axially outside the second pipe header an intake for a fluid cooling medium that is disposed near the second pipe header, and an outlet for the fluid cooling medium near the first pipe header, wherein the first pipe header is in the form of a double walled pipe header having a first pipe header wall portion and a second pipe header wall portion through which the ends of the pipes pass and in which a cooling medium is present, the improvement comprising a boiling water cooling action being produced in the double walled pipe header, said double walled pipe header being arranged horizontally and partially filled with water creating a steam chamber above said water, said steam chamber being connected to an external condenser with the condensate being fed back into the double walled pipe header.

2. A heat exchanger as defined in claim 1, wherein said condenser is water-cooled and a thermoelement that measures the temperature of the water in the double walled pipe header is provided for controlling the quantity of cooling water supplied to the condenser.

3. A heat exchanger as defined in claim 1, wherein said pipes have a loosely-inserted, inner protective sleeve in the region of the double walled pipe header.

4. A heat exchanger as defined in claim 1, wherein each said pipe in the region of the double walled pipe header is surrounded by a separating pipe over at least a portion of the pipe with a space therebetween, the separating pipe being tightly connected to the first and second pipe header wall portions of the double walled pipe header.

5. A heat exchanger as defined in claim 4, including fire resistant insulating material in the space between the inner circumference of the separating pipe and the outer circumference of the pipe.

6. A heat exchanger as defined in claim 1, wherein said separating pipes are vertical and are concentrically surrounded in the region of the double walled pipe header by a socket which at an upper region is radially spaced from the outer circumference of the separating pipe creating an intermediate space, and has an opening to the intermediate space at a lower end of the socket, and has an opening from the intermediate space into the steam chamber of the double walled pipe header at an upper edge of the socket.

7. A heat exchanger as defined in claim 1, wherein an intermediate pipe header is located beneath the second pipe header to create a first chamber having said intake for a fluid cooling medium, and another intermediate pipe header being located above the first pipe header to create a second chamber having said outlet for the fluid cooling medium, each pipe being surrounded by a tubular jacket in the region between the first and second pipe headers, the jackets open at one end in the first chamber, with spacing from the pipe header, and at the other end in the second chamber, with spacing from the pipe header, so that access exists to a space between the pipes and the respective jackets and the fluid cooling medium can be conducted from the first chamber to the second chamber through the space between the pipe and the respective jacket.

8. A heat exchanger as defined in claim 7, wherein the first chamber forms a cooling medium intake chamber and the second chamber forms a cooling medium outlet chamber.

9. A heat exchanger as defined in claim 8, wherein the jackets are beaded in a funnel-like shape at the ends within the cooling medium intake chamber.

10. A heat exchanger as defined in claim 10, including additional heat transfer surfaces being provided in the space between the pipes and the respective jackets, said surfaces being in heat-conductive contact with the outer circumference of the pipe.

11. A heat exchanger as defined in claim 10, wherein the additional heat transfer surfaces are a tubular sheet metal formation that is corrugated in a plane perpendicular to the pipe axis.

12. A heat exchanger as defined in claim 10, wherein the additional heat transfer surfaces are formed by webs that are distributed over the outer circumference of the pipe, are in thermally-conductive connection with the pipe, and leave open a flow path for the cooling medium through the intermediate space.

13. A heat exchanger as defined in claim 1, wherein the pipes are fixedly and tightly connected to the double walled pipe header, and a compensator is provided on at least the second pipe header in order to receive the thermal expansion of each pipe.

14. A heat exchanger as defined in claim 1, wherein associated with each said pipe is a steam-cleaning apparatus at one end that delivers a blast of steam into the pipe at selected intervals for the purpose of cleaning deposited material from the inside of the pipe.

15. A heat exchanger as defined in claim 14, wherein the steam-cleaning apparatus is arranged at the end of each pipe that projects into the process gas outlet chamber.

16. A heat exchanger as defined in claim 14, wherein the steam-cleaning apparatus is arranged at the end of each pipe terminating into the process gas intake chamber.

17. A heat exchanger as defined in claim 16, wherein a steam nozzle that is concentric to the pipe axis, is aimed into the pipe and does little to impede the flow of process gases into the pipe is arranged before the termination of each pipe in the process gas intake chamber, a steam line of which nozzle is guided through the process gas intake chamber in a segment adjacent to the steam nozzle.

18. A heat exchanger as defined in claim 17, wherein in the double walled pipe header, the steam line is guided close to the pipe, guided downward therethrough the first pipe header and into the process gas intake chamber, is bent back toward the first pipe header and supports the steam nozzle at a free end.

19. A heat exchanger as defined in claim 18, wherein in the process gas intake chamber, the steam line forms a 180° pipe bend whose legs are parallel to the pipe axis.

20. A heat exchanger as defined in claim 17, wherein in the segment adjacent to the steam nozzle, the steam nozzle and the steam line are surrounded concentrically by a jacket pipe, with radial spacing therebetween, that terminates inside the double walled pipe header beneath the water level so that water can enter the space between the steam line and the jacket pipe, the space between the steam line and the jacket pipe at the steam nozzle is closed apart from an outlet, an ascending pipe being connected at the outlet and is guided back through the first pipe header wall portion into the double walled pipe header and ends open above the water level, with slight spacing from the second pipe header wall portion, and that in the region of the process gas intake chamber, the flow resistance for steam forming in the intermediate space, is less through the ascending pipe than through the intermediate space.

21. A heat exchanger as defined in claim 20, wherein the radial spacing around the jacket pipe is supplied with an insulation in the region of the process gas intake chamber.

22. A heat exchanger as defined in claim 20, wherein the jacket pipe projects beyond the first pipe header wall portion in order to create an overflow for the water located in the double walled pipe header.

23. A heat exchanger as defined in claim 20, wherein a cross-section of the ascending pipe is larger than a cross-section of the space between the steam line and the jacket pipe.

24. A heat exchanger as defined in claim 1, wherein the underside of the first pipe header wall portion has a fire resistant sheathing.

25. A heat exchanger as defined in claim 24, wherein the sheathing comprises a plurality of fire resistant molded bodies that cover the underside of the pipe header.

* * * * *